Patented Apr. 16, 1929.

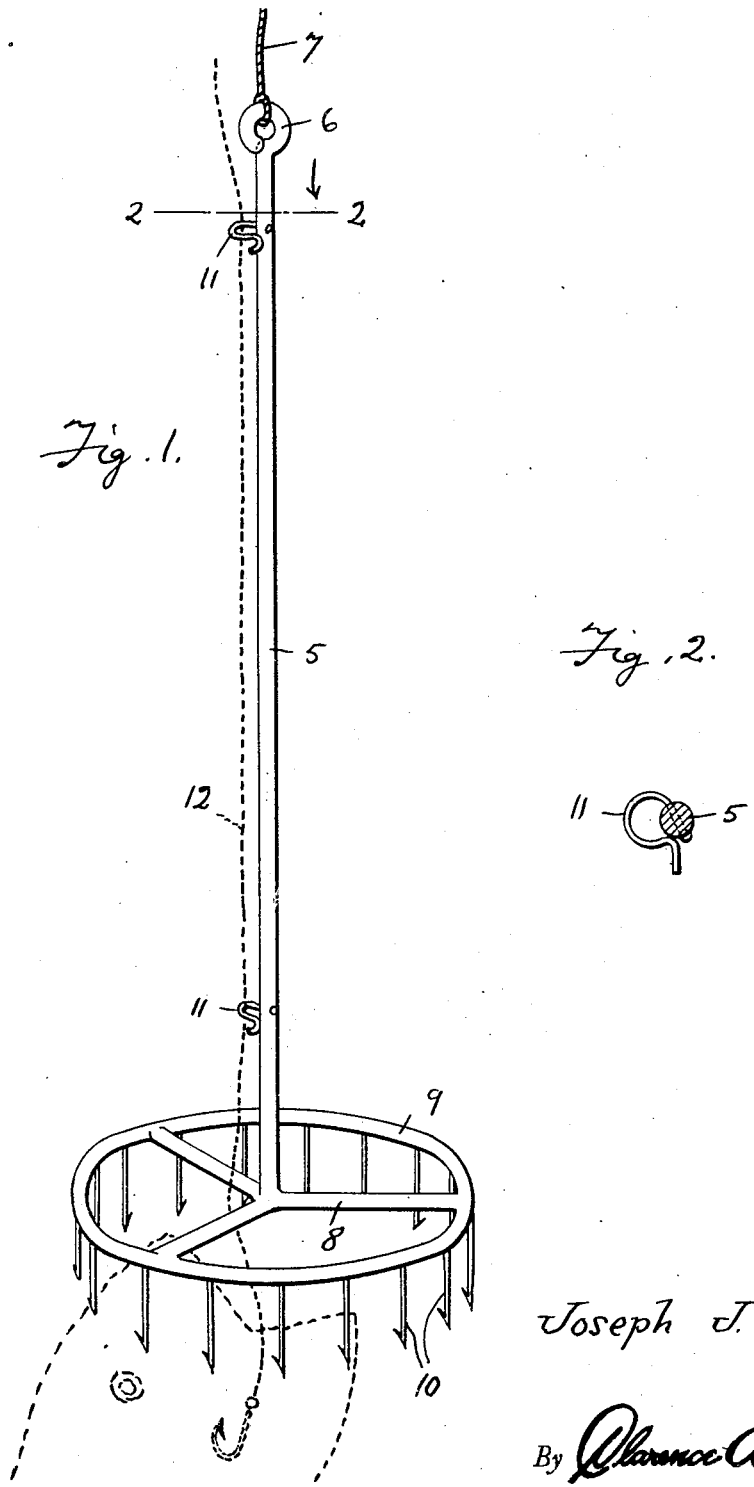

1,709,298

UNITED STATES PATENT OFFICE.

JOSEPH J. ZOPPA, OF GRAND RAPIDS, MICHIGAN.

FISH-LANDING RIG.

Application filed July 11, 1927. Serial No. 204,900.

This invention relates to landing rigs for fish and comprises an attachment in the form of a gaff which may be arranged on the line on which the fish is hooked and adapted to be guided downwardly on the line into a position adjacent the hook end thereof in order that the gaff may engage the fish and thus facilitate the landing of the same.

An important object of the invention is to provide a device of this character which may be easily and quickly arranged in position on the fish line after the fish has been hooked thereby to use the line as a guide for bringing the fish into a gaffing position.

A further object is to provide an article of this character of simple and practical construction, efficient and reliable in performance, inexpensive to manufacture, and otherwise well adapted for the purposes intended thereby.

Other objects and advantages reside in the special construction, combination and arrangement of the various elements forming the invention as more fully hereinafter described and claimed, reference being had to the accompanying drawings forming part hereof, wherein:

Figure 1 is a perspective view showing the landing rig in operative position upon a fish line, and, Figure 2 is a transverse sectional view taken along a line 2—2 of Figure 1.

Referring now to the drawing wherein for the purpose of illustration I have disclosed a preferred embodiment of my invention, I provide a fish landing rig comprising a relatively elongated rod 5 having a ring 6 formed at its upper end to which a line 7 may be attached, and a plurality of radially extending arms 8 formed at its lower end and arranged substantially at right angles to said rod. The ends of the arms 8 support a ring 9, the ring being arranged concentrically with respect to the rod, and extending from the side of the ring in a direction opposite to the rod is provided a plurality of gaff hooks 10, said hooks being spaced apart in parallel relation with the barb of the hook arranged to extend in an inward direction.

Near the upper and lower ends of the rod 5 are fish line guides 11, said guides preferably being formed of spring-like material, with one end thereof open to permit the fishline 12 to be slipped under the open end and retained in the guide.

In the operation of the device should a fish be hooked on the fish line 12 of such a large size as to render it impractical to land the fish, the fish landing rig comprising my invention is slipped on the fish line by means of the guides 11 and permitted to travel downwardly on the fish line to the lower end thereof where the fish is hooked. The fish therefore is brought into contact with the gaff hooks 10 which operate to attach themselves to the fish in a proper manner and by means of the line 7 attached to the upper end of the rod 5 the landing rig with the fish hooked thereon may be pulled into the boat without danger of loosing the fish.

It is obvious that the invention is susceptible to various changes and modifications without departing from the spirit thereof or the scope of the appended claims and I accordingly claim all such forms of the device to which I am entitled.

I claim:

1. In a fish landing rig, a rod having a plurality of line guides carried thereby, having one end open for snapping upon the line, an annulus carried at one end of the rod, a plurality of gaff hooks arranged in spaced relation and extending from the side of the annulus opposite to the rod and longitudinally with respect thereto and means for attaching a landing rig line at the opposite end of the rod.

2. A fish landing rig comprising a rod, a plurality of fish line guides carried thereby, having one end thereof open for snapping upon the line, a plurality of radially extending arms at one end of the rod, a ring formed at the outer ends of said arms, a plurality of gaff hooks carried by the ring and extending in a direction opposite to the rod and landing rig line attaching means at the opposite end of the rod.

In testimony whereof I affix my signature.

JOSEPH J. ZOPPA.